United States Patent
Kuwamura

(10) Patent No.: US 8,362,723 B2
(45) Date of Patent: Jan. 29, 2013

(54) MOTOR DRIVE CIRCUIT

(75) Inventor: Makoto Kuwamura, Kyoto (JP)

(73) Assignee: Rohm Co., Ltd. (JP)

( * ) Notice: Subject to any disclaimer, the term of this patent is extended or adjusted under 35 U.S.C. 154(b) by 460 days.

(21) Appl. No.: 12/739,546

(22) PCT Filed: Oct. 23, 2008

(86) PCT No.: PCT/JP2008/003005
§ 371 (c)(1),
(2), (4) Date: Apr. 23, 2010

(87) PCT Pub. No.: WO2009/054134
PCT Pub. Date: Apr. 30, 2009

(65) Prior Publication Data
US 2010/0219781 A1    Sep. 2, 2010

(30) Foreign Application Priority Data

Oct. 23, 2007 (JP) ................... 2007-275748
Oct. 23, 2007 (JP) ................... 2007-275758
Oct. 23, 2007 (JP) ................... 2007-275760

(51) Int. Cl.
- *H02P 6/16* (2006.01)
- *H02P 7/00* (2006.01)
- *H02P 27/00* (2006.01)
- *H02K 37/00* (2006.01)

(52) U.S. Cl. ............... 318/400.04; 318/432; 318/434; 318/437; 318/599; 318/807

(58) Field of Classification Search ............ 318/400.04, 318/432, 434, 599, 807, 437
See application file for complete search history.

(56) References Cited

U.S. PATENT DOCUMENTS 5,901,268 A * 5/1999 Ando et al. ............. 388/811
6,710,569 B2 * 3/2004 Iwanaga et al. ............ 318/599
(Continued)

FOREIGN PATENT DOCUMENTS
JP 56-41788 A 4/1981
JP 3-103090 A 4/1991
(Continued)

OTHER PUBLICATIONS

First Office Action for Chinese Patent Application No. 200880106125.5, issued Mar. 1, 2012, with English translation.

(Continued)

*Primary Examiner* — Walter Benson
*Assistant Examiner* — Gabriel Agared
(74) *Attorney, Agent, or Firm* — Cantor Colburn LLP

(57) ABSTRACT

The motor drive circuit 100 supplies a drive current to the motor 2 to drive the motor. Each of the first Hall amplifier HAMP1 to the third Hall amplifier HAMP3 is provided for each phase of the motor 2 and receives a pair of Hall signals from a corresponding phase Hall element to generate each phase sine wave voltage SIN_U, SIN_V and SIN_W by amplifying a difference between the pair of Hall signals. Each of the first PWM comparator PCMP1 to the third PWM comparator PCMP3 is provided for each phase of the motor 2 and compares the corresponding phase sine wave voltage SIN_U, SIN_V and SIN_W, with the periodic voltage Vosc to generate each phase PWM signal PWM_U, PWM_V and PWM_W. The drive unit 10 subjects a phase coil, a target to be driven, to pulse drive by using the pulse modulated signal from the corresponding PWM comparator.

23 Claims, 9 Drawing Sheets

U.S. PATENT DOCUMENTS

| | | | |
|---|---|---|---|
| 7,002,308 B2* | 2/2006 | Kinukawa et al. | 318/400.04 |
| 8,093,848 B2* | 1/2012 | Suzuki | 318/432 |
| 2002/0093304 A1 | 7/2002 | Fujii | |
| 2003/0102832 A1* | 6/2003 | Iwanaga et al. | 318/268 |
| 2003/0155880 A1* | 8/2003 | Iwanaga et al. | 318/432 |
| 2004/0007998 A1* | 1/2004 | Yasohara et al. | 318/437 |
| 2005/0184700 A1* | 8/2005 | Fujimura | 318/807 |

FOREIGN PATENT DOCUMENTS

| | | |
|---|---|---|
| JP | 2002-218783 A | 8/2002 |
| JP | 2005-312299 A | 11/2005 |
| JP | 2007-116764 A | 5/2007 |
| JP | 2007-202230 A | 8/2007 |
| WO | 2007/083524 A1 | 7/2007 |

OTHER PUBLICATIONS

International Preliminary Examination Report on Patentability (I) issued Jun. 1, 2010 with English translation.
International Search Report for PCT Application No. PCT/JP2008/003005 mailed Jan. 27, 2009 with English translation.
Notification for Reasons for Refusal for Patent Application No. 2007-275760, dispatched Jun. 5, 2012, with English translation.

* cited by examiner

MOTOR DRIVE CIRCUIT

CROSS REFERENCE TO RELATED APPLICATIONS

This is a U.S. national stage application of International Application No. PCT/JP2008/003005, filed on 23 Oct. 2008. Priority under 35 U.S.C. §119(a) and 35 U.S.C. §365(b) is claimed from Japanese Application Nos. JP2007-275748, filed 23 Oct. 2007, JP2007-275758, filed 23 Oct. 2007, and JP 2007-275760, filed 23 Oct. 2007, the disclosures of which are also incorporated herein by reference.

BACKGROUND OF THE INVENTION

1. Field of the Invention

The present invention relates to a motor drive circuit that controls rotation of a motor.

2. Description of the Related Art

Brushless direct current (DC) motors are used for rotating cooling fans or disk-type media. A brushless DC motor generally comprises a rotor provided with a permanent magnet and a stator provided with multiple phase coils connected together in a star connection. The coil is excited by controlling a current supplied thereto such that the rotor is driven by relatively rotating the rotor relative to the stator. The brushless DC motor generally comprises a sensor such as a Hall element or an optical encoder for detecting a rotational position of the rotor, and switches a current to be supplied to each phase coil in accordance with the position detected by the sensor, so that the rotor is supplied with an adequate torque.

A method (hereinafter, referred to as a "sine wave drive method") is known in which, when providing 180-degree excitation of a three-phase motor, a switching voltage to be supplied to each phase coil is pulse-modulated such that each phase coil current is brought close to a sine wave. A drive noise from the motor can be reduced by the sine wave drive.

SUMMARY OF THE INVENTION

1. One of the illustrative purposes of the present invention is to provide a motor drive circuit capable of subjecting a three-phase motor to the sine wave drive.

2. It is sometime required that a motor is driven based on a pulse width modulated signal that is generated by a microcomputer outside the motor drive circuit in accordance with a torque exerted on the motor. An embodiment of the present invention has been made in view of such circumstances, and one of the illustrative purposes thereof is to provide a motor drive circuit capable of driving a three-phase motor based on a pulse width modulated signal from outside, while providing 180-degree sine wave excitation of the motor by pulse width modulated drive.

3. Also, it is sometimes required that a current flowing through a coil of the motor is to be limited in terms of circuit protection or torque limitation. An embodiment of the present invention has been made in view of such circumstances, and one of the illustrative purposes thereof is to provide a motor drive technique capable of limiting a current flowing through a three-phase motor, while providing 180-degree sine wave excitation of the motor by a pulse width modulated drive method.

1. An embodiment of the present invention relates to a motor drive circuit that drives a three-phase motor by supplying a drive current to the three-phase motor. The motor drive circuit comprises: a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals; a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal; a drive unit operative to subject a phase coil, a target to be driven, to pulse drive by using the pulse modulated signal from the corresponding phase pulse modulation comparator; and a gain setting unit that sets a gain of the first Hall amplifier, the second Hall amplifier or the third Hall amplifier based on an error between a detection voltage corresponding to at least one of the sine wave voltages of the first Hall amplifier, the second Hall amplifier and the third Hall amplifier and a torque setting voltage indicating a torque exerted on the three-phase motor.

In the embodiment, the sine wave voltage outputted from each of the first Hall amplifier, the second Hall amplifier and the third Hall amplifier is determined based on the torque setting voltage, eventually allowing a duty ratio of the pulse modulated signal to be controlled based on the torque setting voltage. According to the embodiment, the sine wave voltage is not affected by the amplitude of the pair of Hall signals, allowing the motor to be rotated with a torque corresponding to the torque setting voltage.

The detection voltage may be a signal corresponding to the amplitude of the sine wave voltage. In this case, the amplitude of the sine wave voltage can be kept constant in accordance with the torque setting voltage.

The gain setting unit may include: a synthesis unit that synthesizes the detection voltage from a detection signal corresponding to each of the sine wave voltages of the first Hall amplifier, the second Hall amplifier and the third Hall amplifier; and an error amplifier that generates an error signal corresponding to an error between the detection voltage and the torque setting voltage, so that each gain of the first Hall amplifier, the second Hall amplifier and the third Hall amplifier is set in accordance with the error signal.

Each of the first Hall amplifier, the second Hall amplifier and the third Hall amplifier may output, as a current signal, a detection signal having a waveform obtained by subjecting the sine wave voltage to half-wave rectification, and the synthesis unit may include a synthesizing resistor, one end of which receives current signals outputted from the first Hall amplifier, the second Hall amplifier and the third Hall amplifier and a voltage at the other end of which is fixed, so that a voltage drop across the synthesizing resistor is outputted as the detection voltage. In this case, a direct current voltage corresponding to the amplitude of the sine wave signal can be obtained by synthesizing the voltage from each phase sine wave voltage.

The drive unit may include: a first inverter, a second inverter and a third inverter, which are push-pull inverters provided for each phase; and a current detecting resistor that is provided between a common connection point on the lower voltage sides of the first inverter, the second inverter and the third inverter and a ground terminal. The motor drive circuit may further comprise a current limit comparator that compares a voltage drop across the current detecting resistor with a predetermined threshold voltage. The drive unit may stop excitation of each coil of the three-phase motor when the voltage drop exceeds the threshold voltage. In this case, current limitation can be performed without filtering the voltage drop across the current detecting resistor, allowing an overshoot at the start-up to be suppressed.

After stopping excitation of each coil of the three-phase motor, the drive unit may release the stop of excitation based on a release signal having a predetermined cycle. The predetermined cycle may be synchronized with the periodic voltage. Further, the release signal may be synchronized with a timing when the periodic voltage takes a peak value or a bottom value. In this case, the current limitation can be performed in synchronization with the pulse drive.

The drive unit may receive a pulse modulated control signal inputted from outside, which has been subjected to pulse modulation, and perform logic synthesis on the pulse modulated control signal with each output signal from the first pulse modulation comparator, the second pulse modulation comparator and the third pulse modulation comparator, so that the three-phase motor is driven based on the synthesized signal. In this case, a torque exerted on the motor can also be controlled by the pulse modulated control signal from outside.

The motor drive circuit may be monolithically integrated on a single semiconductor substrate. The integration used herein includes the cases where all constituents of a circuit are formed on the semiconductor substrate, or where major constituents thereof are integrated on the substrate. In the latter case, part of resistors or capacitors may be mounted outside the semiconductor substrate for controlling its circuit constant.

Another embodiment of the present invention relates to a cooling apparatus. This apparatus comprises a three-phase fan motor and the motor drive circuit according to any one of the aforementioned motor drive circuits for driving the three-phase fan motor.

Yet another embodiment of the present invention relates to a motor drive method for driving a three-phase motor by supplying a drive current to the three-phase motor. The method comprises: amplifying a difference between a pair of Hall signals of each phase to generate each phase sine wave voltage; comparing the each phase sine wave voltage with a periodic voltage to generate each phase pulse modulated signal; subjecting a phase coil, a target to be driven, to pulse drive by using a corresponding phase pulse modulated signal; and adjusting a gain for amplifying the difference between the pair of Hall signals such that a detection voltage corresponding to at least one phase sine wave voltage and a torque setting voltage indicating a torque exerted on the three-phase motor, are equal to each other.

2. An embodiment of the present invention relates to a motor drive circuit that drives a three-phase motor by supplying a drive current to the three-phase motor. The motor drive circuit comprises: a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals; a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal; an outside control terminal to which an external pulse modulated signal having a duty ratio corresponding to a target torque is inputted from an outside circuit; and a drive unit that synthesizes a signal from the each phase pulse modulated signal and the external pulse modulated signal to subject a phase coil, a target to be driven, to pulse drive based on the synthesized signal.

According to the embodiment, an effective duty ratio can be adjusted by synthesizing a signal from the pulse modulated signal based on the sine wave voltage and the external pulse modulated signal, allowing a torque exerted on the motor to be controlled.

The motor drive circuit according to an embodiment may further comprise a gain setting unit that sets a gain of the first Hall amplifier, the second Hall amplifier or the third Hall amplifier based on an error between a detection voltage corresponding to at least one of the sine wave voltages of the first Hall amplifier, the second Hall amplifier and the third Hall amplifier and a predetermined reference voltage. In this case, the torque can also be controlled in accordance with a voltage level of the reference voltage. That is, it can be realized that the torque control is performed based on the reference voltage when the external pulse modulated signal is not supplied, while the torque control is performed based on the external pulse modulated signal when the signal is supplied.

The motor drive circuit may be monolithically integrated on a single semiconductor substrate. The integration used herein includes the cases where all constituents of a circuit are formed on the semiconductor substrate, or where major constituents thereof are integrated on the substrate. In the latter case, part of resistors or capacitors may be mounted outside the semiconductor substrate for controlling its circuit constant.

Another embodiment of the present invention relates to a cooling apparatus. The apparatus comprises a three-phase fan motor and the motor drive circuit according to any one of the aforementioned motor drive circuits for driving the three-phase fan motor.

Yet another embodiment of the present invention relates to a motor drive method for driving a three-phase motor by supplying a drive current to the three-phase motor. The method comprises: amplifying a difference between a pair of Hall signals of each phase to generate each phase sine wave voltage; comparing the each phase sine wave voltage with a periodic voltage to generate each phase pulse modulated signal; generating an external pulse modulated signal having a duty ratio corresponding to a target torque; and synthesizing a signal from the each phase pulse modulated signal and the external pulse modulated signal to subject a phase coil, a target to be driven, to pulse drive based on the synthesized signal.

The motor drive method of an embodiment may further comprise adjusting a gain for amplifying the difference between the pair of Hall signals such that a detection voltage corresponding to at least one phase sine wave voltage and the predetermined reference voltage are equal to each other.

3. An embodiment of the present invention relates to a motor drive circuit that drives a three-phase motor by supplying a drive current to the three-phase motor. The motor drive circuit comprises: a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals; a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal; a first inverter, a second inverter and a third inverter, which are push-pull inverters provided for each phase; a drive unit that includes a current detecting resistor that is provided between a common connection point on the lower voltage sides of the first inverter, the second inverter and the third inverter and a ground terminal, and that subjects a phase coil, a target to be driven, to pulse drive by using the pulse modulated signal from the corresponding phase pulse modulation comparator; and a current limit comparator that compares a voltage drop across the current detecting resistor with a predetermined threshold voltage. The drive unit stops excitation of each coil of the three-phase motor when the voltage drop exceeds the threshold voltage.

According to the embodiment, excitation is stopped immediately after a coil current exceeds a threshold value, allowing the coil current to be limited. The current limit comparator compares a voltage drop across the current detecting resistor directly with the threshold voltage without smoothing the voltage drop by a filter or the like, allowing a current overshoot due to delay in limiting a current to be suppressed.

After stopping excitation of each coil of the three-phase motor, the drive unit may release the stop of excitation based on a release signal having a predetermined cycle. The motor's continued stop of excitation can be prevented by periodically releasing the stop after the excitation is stopped, allowing the motor to be rotated again.

The release signal may be synchronized with the periodic voltage. By synchronizing the release signal with the cycle of the pulse width modulated signal, current limitation can be performed on the motor while subjecting the motor to pulse width modulation (PWM) drive.

The release signal may be synchronized with a timing when the periodic voltage takes a peak value or a bottom value. When generating a triangle-shaped, or a saw tooth-shaped periodic voltage, a pulse signal whose level makes a transition at its peak and bottom is also generated. The release signal is readily generated by using the pulse signal.

The drive unit may excite the coil when one or two of the pulse modulated signals outputted from the first pulse modulation comparator, the second pulse modulation comparator and the third pulse modulation comparator are at the level indicating conduction, and when the voltage drop is smaller than the threshold voltage. The drive unit may stop excitation of the coil immediately after the voltage drop exceeds the threshold voltage.

The motor drive circuit may be monolithically integrated on a single semiconductor substrate. The integration used herein includes the cases where all constituents of a circuit are formed on the semiconductor substrate, or where major constituents thereof are integrated on the substrate. In the latter case, part of resistors or capacitors may be mounted outside the semiconductor substrate for controlling its circuit constant.

Another embodiment of the present invention relates to a cooling apparatus. This apparatus comprises a three-phase fan motor and a motor drive circuit for driving the motor.

According to the embodiment, an overcurrent in the motor can be preferably suppressed.

Yet another embodiment of the present invention relates to a motor drive method for driving a three-phase motor by supplying a drive current to the three-phase motor. The method comprise: amplifying a difference between a pair of Hall signals of each phase to generate each phase sine wave voltage; comparing the each phase sine wave voltage with a periodic voltage to generate each phase pulse modulated signal; subjecting a selected phase coil, a target to be driven, to pulse drive by using a corresponding phase pulse modulated signal; converting a coil current of the three-phase motor into a voltage proportional to the coil current; and comparing the converted voltage with a predetermined threshold voltage such that excitation of each coil of the three-phase motor is stopped when the converted voltage exceeds the predetermined threshold voltage. According to the embodiment, excitation is stopped immediately after a coil current exceeds a threshold value, allowing a coil current to be limited.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
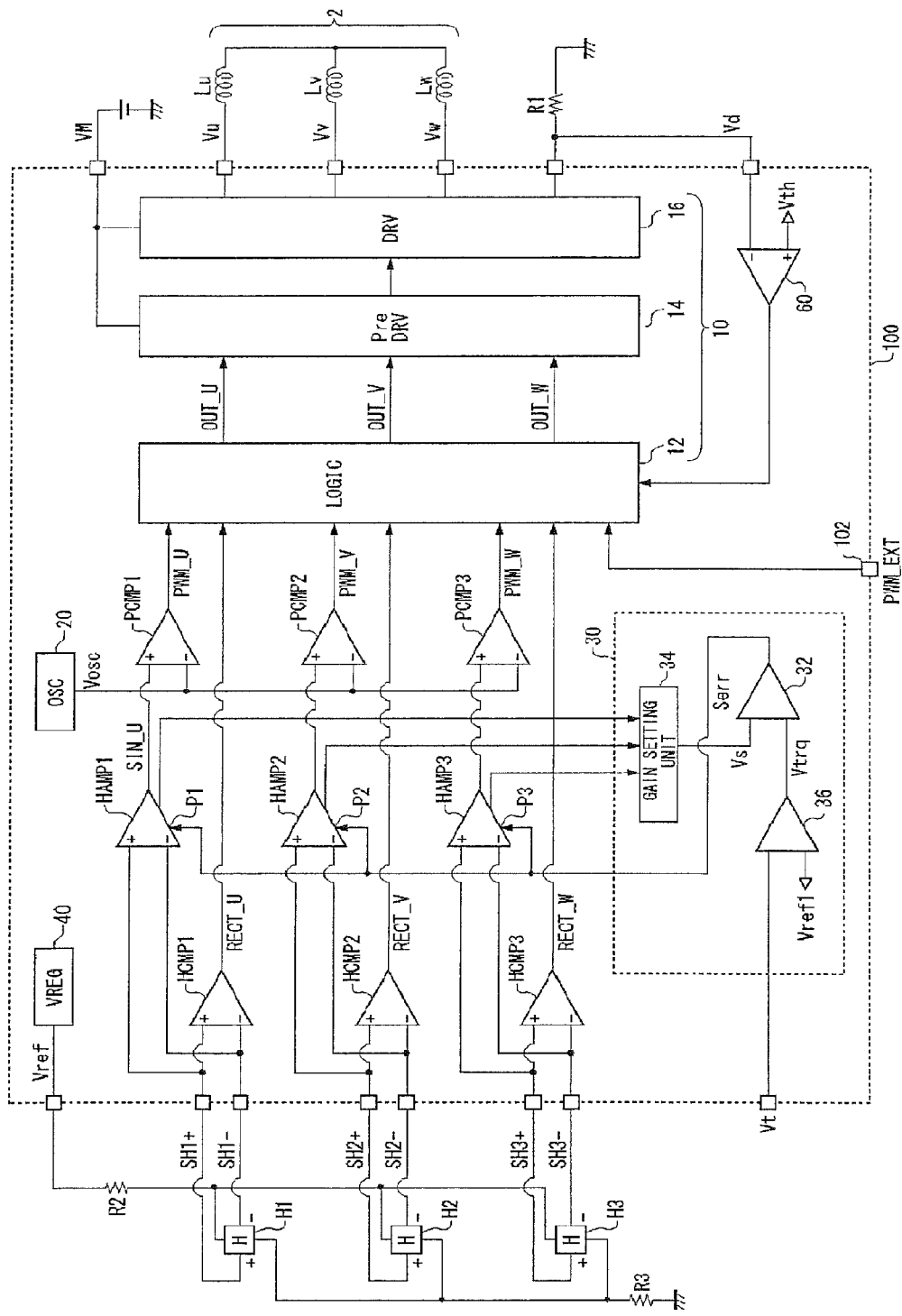
FIG. 1 is a circuit diagram illustrating a structure of a motor drive circuit according to an embodiment.

The present invention will now be described based on preferred embodiments with reference to the accompanying drawings. The same or equivalent constituents, member, or processes illustrated in each drawing will be denoted with the same reference numerals, and the duplicative descriptions thereof are appropriately omitted. The preferred embodiments do not intend to limit the scope of the invention but exemplify the invention. All of the features and the combinations thereof described in the embodiments are not necessarily essential to the invention.

Herein, "the state where a member A is connected to a member B" includes not only the state where the member A is physically and directly connected to the member B but also the state where the member A is indirectly connected to the member B via another member that does not affect electrically the connection state between them. Likewise, "the state where a member C is provided between a member A and a member B" includes not only the state where the member A and the member C, or the member B and the member C, are connected directly, but also the state where they are connected indirectly via another member that does not affect electrically the connection state between them.

Herein, symbols denoting voltage signals, current signals or resistors are intended to represent respective voltage values, current values or resistance values, as necessary.

FIG. 1 is a circuit diagram illustrating the structure of the motor drive circuit 100 according to the embodiment. The motor drive circuit 100 supplies a drive current to a sensorless brushless DC motor (hereinafter, simply referred to as a "motor") 2 to control rotation of the motor. The motor 2 is a three-phase motor including U-phase, V-phase and W-phase coils Lu, LV and Lw. For example, the motor 2 is a fan motor, which is arranged facing an object to be cooled, and the motor drive circuit 100 and a motor 2 compose a cooling apparatus.

The motor drive circuit 100 supplies a drive current to the motor 2 to drive the motor. To the motor drive circuit 100, are connected a first Hall element H1 to a third Hall element H3. The motor drive circuit 100 comprises: a first Hall comparator HCMP1 to a third Hall comparator HCMP3; a first Hall amplifier HAMP1 to a third Hall amplifier HAMP3; a first PWM comparator PCMP1 to a third PWM comparator PCMP3; a drive unit 10; an oscillator 20; a gain setting unit 30; a regulator 40; and a current limit comparator 60.

The regulator 40 generates a predetermined reference voltage Vref. The reference voltage Vref is applied to first bias terminals of the first Hall element H1 to the third Hall element H3 through a bias resistor R2. Second bias terminals of the first Hall element H1 to the third Hall element H3 are connected together in common, which are grounded through a bias resistor R3. The first Hall element H1 to the third Hall element H3 are arranged so as to be associated with the U-phase coil Lu, the V-phase coil Lv and the W-phase coil Lw of the motor 2, respectively. The first Hall element H1 to the third Hall element H3 may be connected together in series not in parallel with each other.

The first Hall element H1 outputs a pair of Hall signals SH1± corresponding to a position of a rotor. Likewise, the second Hall element H2 and the third Hall element H3 output pairs of Hall signals SH2± and SH3±, respectively. The motor drive circuit 100 receives each phase pair of Hall signals SH±.

Each of the first Hall comparator HCMP1 to the third Hall comparator HCMP3 is provided for each of the U-phase, V-phase and W-phase of the motor 2, receiving the pair of Hall signals SH±1, SH±2 or SH±3 from the Hall element H1, H2 or H3 of the corresponding U-phase, V-phase or W-phase. Each of the first Hall comparator HCMP1 to the third Hall comparator HCMP3 compares a level of the corresponding pair of Hall signals SH1±, SH2± or SH3± to generate a rectangular wave signal RECT_U, RECT_V or RECT_W for each of the U-phase, V-phase and W-phase.

Each of the first Hall amplifier HAMP1 to the third Hall amplifier HAMP3 is provided for each of the U-phase, V-phase and W-phase of the motor 2, receiving the pair of Hall signals SH1±, SH2± or SH3± from the Hall element H1, H2 or H3 of the corresponding U-phase, V-phase or W-phase. Each of the first Hall amplifier HAMP1 to the third Hall amplifier HAMP3 amplifies a difference between the inputted pair of Hall signals SH1±, SH2± or SH3± to generate a sine wave voltage SIN_U, SIN_V or SIN_W for each of the U-phase, V-phase and W-phase. Each of the first Hall amplifier HAMP1 to the third Hall amplifier HAMP3 is variable in its gain in accordance with a gain control signal from outside, accordingly a gain control terminal P1 for receiving the gain control signal is provided therein.

The oscillator 20 generates a triangle-shaped or a saw tooth-shaped periodic voltage Vosc. Each of the first PWM comparator PCMP1 to the third PWM comparator PCMP3 is provided for each of the U-phase, V-phase and W-phase of the motor 2. To one (inverting input terminal-) of input terminals of each of the first PWM comparator PCMP1 to the third PWM comparator PCMP3, is inputted the periodic voltage Vosc, while to the other input terminal (non-inverting input terminal +) thereof, is inputted the sine wave voltage SIN_U, SIN_V or SIN_W of the corresponding U-phase, V-phase or W-phase. Each of the first PWM comparator PCMW1 to the third PWM comparator PCMW3 compares the sine wave voltage SIN_U, SIN_V or SIN_W of the corresponding U-phase, V-phase or W-phase with the periodic voltage Vosc to generate each phase pulse width modulated signal (hereinafter, referred to as a PWM signal) PWM_U, PWM_V and PWM_W.

The drive unit 10 includes a logic unit 12, a pre-driver 14 and driver 16. The drive unit 10 selects a phase to be driven based on the rectangular wave signals RECT_U, RECT_V and RECT_W from the first Hall comparator HCMP1 to the third Hall comparator HCMP3. The drive unit 10 further subjects the coil to be driven, selected based on the rectangular wave signals RECT_U, RECT_V and RECT_W, to pulse drive by using the PWM signal from the corresponding phase pulse modulated comparator PCMP.

The logic unit 12 performs logic synthesis on the rectangular wave signals RECT and the PWM signals. The driver 16 is a bridge circuit including a high-side transistor and a low-side transistor for each phase. The pre-driver 14 switches on/off of the transistors in the driver 16 based on an output signal from the logic unit 12. The detailed description with respect to the driver unit 10 will be omitted because the structure and the operations thereof are not different from those of a drive circuit to which a typical 180-degree excitation is provided.

The gain setting unit 30 sets a gain of the first Hall amplifier HAMP1 to the third Hall amplifier HAMP3 based on an error between a detection voltage corresponding to at least one of the sine wave voltages SIN_U, SIN_v and SIN_W from the first Hall amplifier HAMP1 to the third Hall amplifier HAMP3, and a torque setting voltage Vtrq indicating a torque exerted on the motor 2.

Preferably, the detection voltage Vs is a signal corresponding to the amplitudes of the sine wave voltages SIN_U, SIN_v and SIN_W. In order to generate the detection voltage Vs corresponding to the amplitudes, the gain setting unit 30 is provided with an error amplifier 32, a synthesis unit 34, and an amplifier 36. The synthesis unit 34 synthesizes the detection voltage Vs from the detection signals 51 to S3 corresponding to the sine wave voltages SIN_U, SIN_v and SIN_W from the first Hall amplifier HAMP1 to the third Hall amplifier HAMP3. The synthesis unit 34 will be described in detail below.

The amplifier 36 amplifies a difference between the torque control voltage Vt from outside and the reference voltage Vref. The torque setting voltage Vtrq outputted from the amplifier 36 is one indicating a torque exerted on the motor 2. The error amplifier 32 amplifies the error between the detection voltage Vs and the torque setting voltage Vtrq to generate an error signal Serr. The error signal Serr is inputted to gain control terminals P1-P3 of the first Hall amplifier HAMP1 to the third Hall amplifier HAMP3, allowing each gain to be controlled.

Subsequently, an operation of setting a gain by the gain setting unit 30 will be described. Paying attention to a single phase, for example, the U-phase, a feedback loop is formed by the first Hall amplifier HAMP1 and the gain setting unit 30. Because an imaginary short holds in a steady state in the error amplifier 32 of the gain setting unit 30, feedback is provided such that Vs=Vtrq holds. Herein, Vs is a voltage corresponding to the amplitudes of the sign wave voltages SIN_U, SIN_v and SIN_W, which are outputted from the first Hall amplifier HAMP1 to the third Hall amplifier HAMP3, and hence the amplitude of the sine wave voltage SIN_U is stabilized to a value corresponding to the torque setting voltage Vtrq by the feedback.

The first PWM comparator PCMP1 slices the periodic voltage Vosc by the sine wave voltage SIN_U to generate a pulse width modulated PWM signal PWM_U. That is, a duty ratio of the PWM signal PWM_U is varied in accordance with the amplitude of the sine wave voltage SIN_U such that a torque exerted on the motor 2 is adjusted.

Figure 2A:
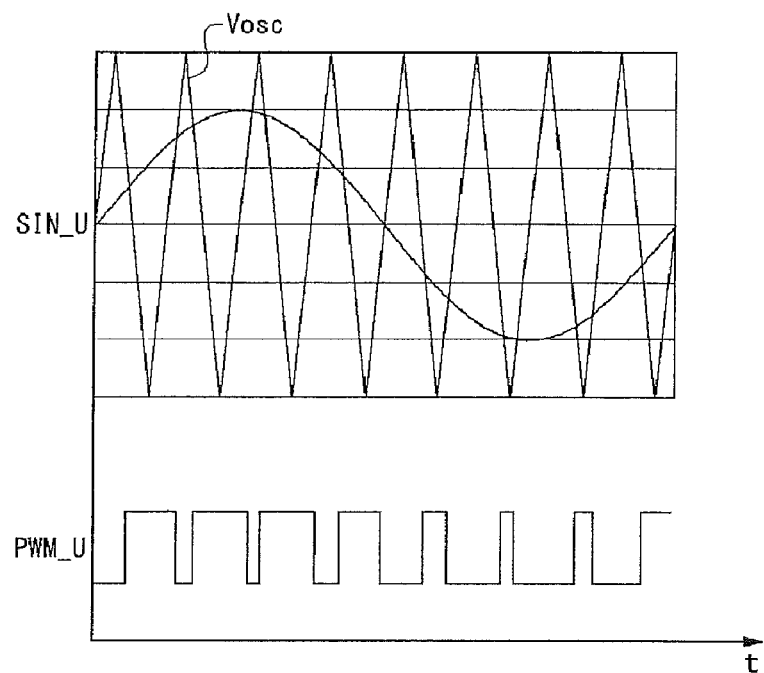
FIGS. 2A and 2B are time charts illustrating operating states of the motor drive circuit in FIG. 1.
Figure 2B:
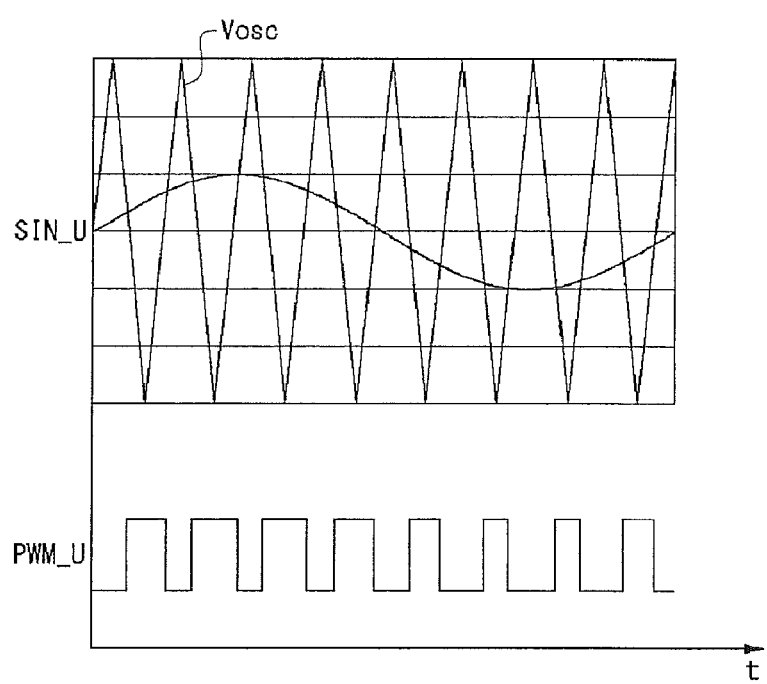

FIGS. 2A and 2B are time charts illustrating operating states of the motor drive circuit 100 in FIG. 1. The vertical axis and the horizontal axis of the time charts illustrated herein are appropriately enlarged or reduced for easier understanding, and each illustrated waveform is also simplified for the sake of facilitating the understanding.

FIGS. 2A and 2B illustrate time charts with respect to different torque setting voltage Vtrq. The amplitudes of the sine wave voltage SIN_U can be kept different from each other by the different torque setting voltages Vtrq. When the amplitude of the sine wave voltage SIN_U is varied, the duty ratio of the PWM signal PWM_U is also varied.

According to the motor drive circuit 100 in FIG. 1, the duty ratio of the PWM signal PWM_U can be varied in accordance with the torque setting voltage by controlling the gain of the first Hall amplifier HAMP 1 that amplifies the pair of Hall signals, based on the torque setting voltage, allowing the motor 2 to be rotated with a desired torque. The same is true with respect to the V-phase and W-phase.

The amplitudes of the pair of Hall signals from the Hall element are different from each other in accordance with characteristic or a bias state of the Hall element. According to the motor drive circuit 100 in FIG. 1, the sine wave voltages SIN_U, SIN_V and SIN_W are not dependent on the amplitude of the pair of Hall signals, allowing the motor 2 to be rotated with a torque corresponding to the torque setting voltage Vtrq.

Figure 3:
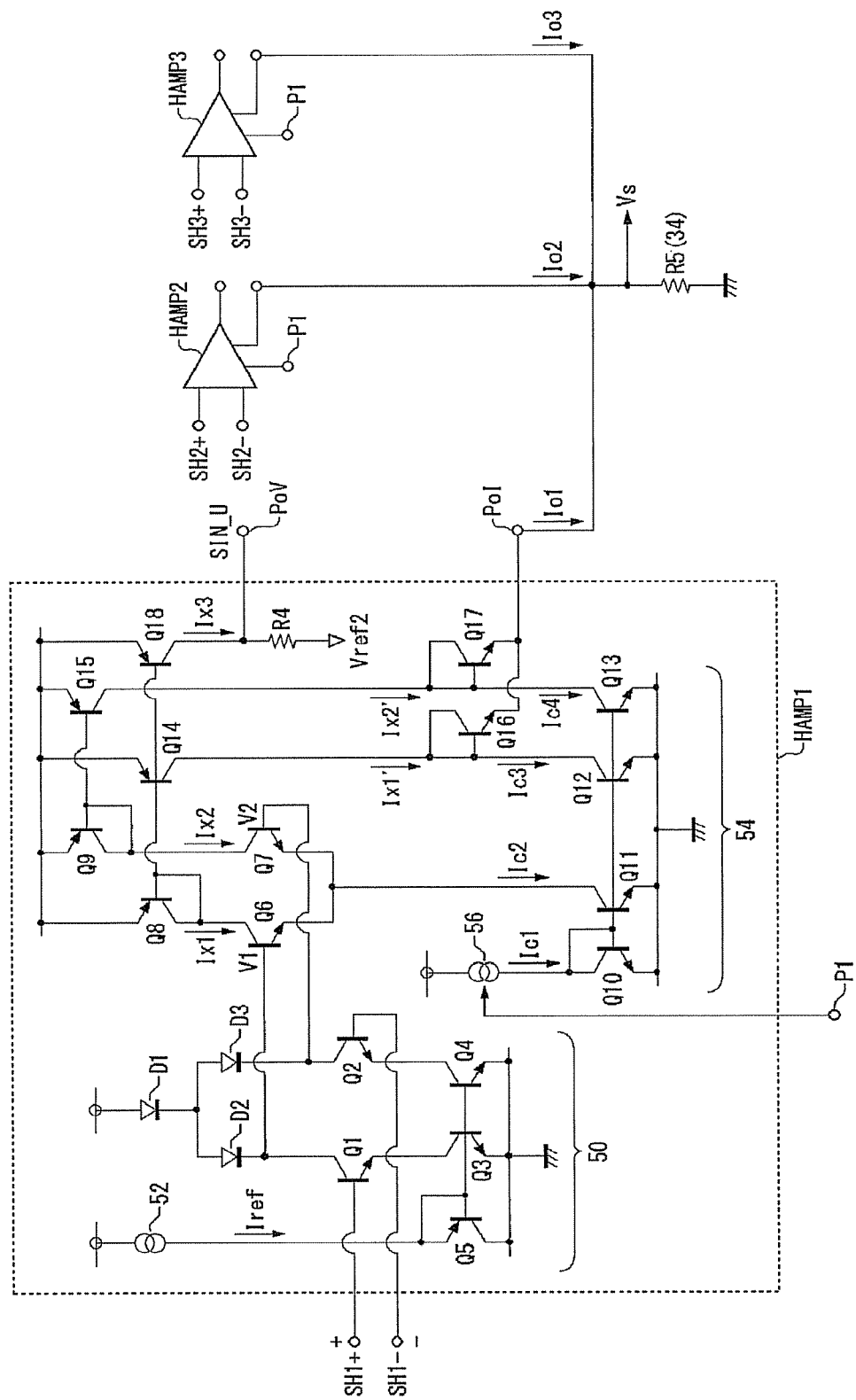
FIG. 3 is a circuit diagram illustrating a structure example of a first Hall amplifier to a third Hall amplifier and a synthesis unit.

FIG. 3 is a circuit diagram illustrating a structure example of the first amplifier HAMP1 to the third Hall amplifier HAMP3, and the synthesis unit 34. Because the three amplifiers have the same structure, only the first Hall amplifier HAMP1 will be described in detail.

The first Hall amplifier HAMP1 includes an inverting input terminal −, a non-inverting input terminal +, again control terminal P1, a voltage output terminal PoV, and a current output terminal PoI, as input/output terminals. An input stage of the first Hall amplifier HAMP1 is provided with a differential amplifier 50. The differential amplifier 50 includes an input differential pair Q1 and Q2, diodes D1 to D3, transistors Q3 and Q4 composing a current mirror load, a constant current source 52, and a transistor Q5.

The bases of the input differential pair Q1 and Q2 are the non-inverting input terminal + and the inverting terminal −, respectively. The transistors Q3 to Q5 are connected in a current mirror fashion and biased by a reference current Iref generated by the constant current source 52. The diodes D1 to D3 are provided for aligning voltage levels.

In the subsequent stage of the differential amplifier 50, is provided an output stage 54. To the output stage 54 are inputted voltages V1 and V2 of the collectors of the transistors Q1 and Q2. A constant current source 56 generates a current Ic1 corresponding to the error signal Serr inputted to the gain control terminal P1. Transistors Q10 to Q13 are connected in a current mirror fashion, a current proportional to the constant current Ic1 flowing through each of the transistors. Transistors Q6 to Q9 compose a differential amplifier biased by a current Ic2 flowing through the transistor Q11. To the base of the transistor Q6, is inputted a voltage V1 corresponding to the difference between the pair of Hall signals SH1± such that a current Ix1 corresponding to the difference therebetween flows through the base. Likewise, a current Ix2 corresponding to the difference between the pair of Hall signals SH±1 flows through the transistor Q7.

The transistor Q8 is provided on a pathway of the transistor Q6, and the transistor Q14 is connected to the transistor Q8 in a current mirror fashion. Accordingly, a current Ix1' proportional to the current Ix1 flows through the transistor Q14. Likewise, a current Ix2' proportional to the current Ix2 flows through the transistor Q15.

A collector current in the transistor Q16 has a difference between the current Ix1' and a constant current Ic3. Likewise, a collector current in the transistor Q17 has a difference between the current Ix2' and a constant current Ic4. A current synthesized from collector currents (emitter currents) of the transistors Q16 and Q17 is outputted from the current output terminal PoI. A detection signal Io1 outputted from the current output terminal PoI becomes a current signal obtained by subjecting the sine wave voltage SIN_U to half-wave rectification.

The transistor Q18 is connected to the transistor Q8 in a current mirror fashion, and therefore a current Ix3 proportional to the current Ix1 flows through the transistor Q18. One end of an output resistor R4 is biased by a reference voltage Vref2, occurring a voltage drop (R4×Ix3). The sine wave voltage SIN_U of Vref2+R4×Ix3 is outputted form the voltage output terminal PoV. That is, the reference voltage Vref2 is one that sets a bias level of the sine wave voltage SIN_U.

The synthesis unit 34 includes a synthesizing resistor R5. One end of the synthesizing resistor R5 is grounded, and the other end thereof receives the detection signals Io1 to Io3 outputted from the first Hall amplifier HAMP1 to the third Hall amplifier HAMP3. A voltage drop of R5×(Io1+Io2+Io3) occurs in the synthesizing resistor R5. The synthesis unit 34 outputs the voltage drop across the synthesizing resistor R5 as the detection voltage Vs.

Figure 4:
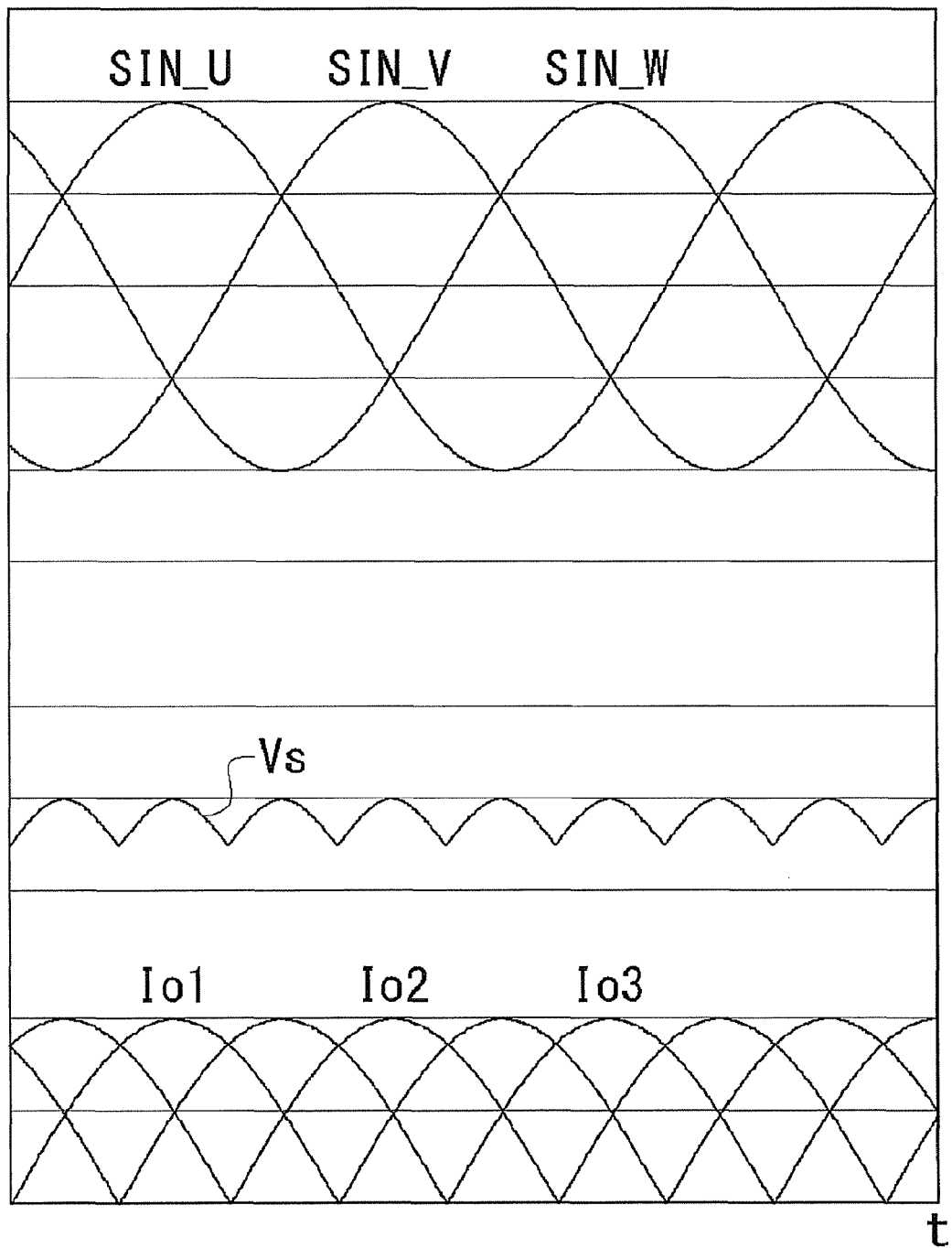
FIG. 4 is time charts illustrating operating states of the Hall amplifiers and the synthesis unit in FIG. 3.

FIG. 4 is time charts illustrating operating states of the Hall amplifiers and the synthesis unit in FIG. 3. The detection signals Io1 to Io3 are generated by subjecting the sine wave voltage SIN_U, SIN_V and SIN_W to half-wave rectification, respectively. The detection voltage Vs is synthesized from the detection signals Io1 to Io3 by adding them together. The detection voltage Vs takes a voltage value corresponding to the amplitudes of the sine wave voltages SIN_U, SIN_V and SIN_W.

Although the embodiment has been described with respect to the case where the detection voltage Vs is synthesized from the detection signals Io1 to Io3 corresponding to the sine wave voltages SIN_U, SIN_V and SIN_W, the present invention should not be limited thereto. And, it may be possible that the detection voltage Vs corresponding to the amplitude of any one of the sine wave voltage, for instance, sine wave voltage SIN_U, is generated and feedback is performed on the detection voltage such that the detection voltage is equal to the torque setting voltage Vtrq. Further, although the case where the detection signals Io1 to Io3 are added together as current signals by using resistors has been described, it may be possible that the detection signals are added together as voltage signals by an adder using an operational amplifier.

Subsequently, a method for performing torque control by limiting a coil current flowing through the motor 2, will be described. In order to do that, the motor drive circuit 100 comprises a current limit comparator 60. The current limit comparator 60 compares a voltage Vd corresponding to a current flowing through the coil of the motor 2 with a predetermined threshold voltage Vth to stop switching of the driver 16 when Vth>Vd holds, thereby allowing excitation of the motor 2 to be stopped.

Figure 5:
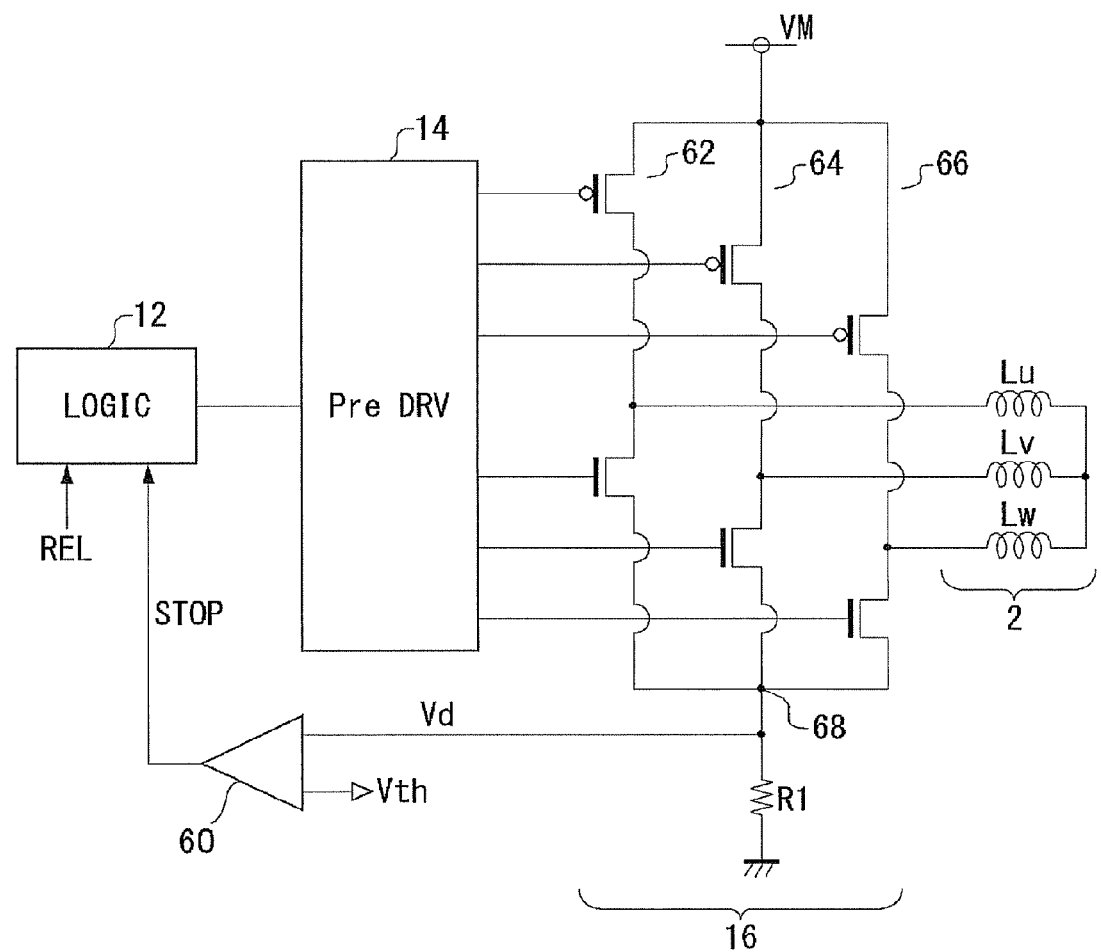
FIG. 5 is a detailed circuit diagram illustrating a peripheral circuit associated with a current limit comparator.

FIG. 5 is a detailed circuit diagram illustrating a peripheral circuit associated with the current limit comparator 60. The driver 16 includes a first inverter 62, a second inverter 64 and a third inverter 66, which are push-pull inverters provided for each of the U-phase, V-phase and W-phase. A current detecting resistor R1 is provided between a common connection point 68 of the first inverter 62 to the third inverter 66 and a ground terminal.

A voltage drop (R1×Icoil) proportional to the coil current Icoil occurs in the current detecting resistor R1. The current limit comparator 60 compares the voltage drop Vd across the current detecting resistor R1 with the predetermined threshold voltage Vth. An output signal (hereinafter, referred to as a stop signal STOP) from the current limit comparator 60 in inputted to the logic unit 12. Referring to the stop signal STOP, the logic unit 12 forces each transistor of the driver 16 to be switched off when Vd>Vt holds, irrespective of the level of the PWM signal. Part of the transistors may be in on-states so as to regenerate the motor.

To the logic unit 12, is inputted a release signal REL having a predetermined cycle. The logic unit 12 releases the stop of excitation based on the release signal REL. It is desirable that the release signal REL is synchronized with a periodic voltage Vosc generated by the oscillator 20. For example, when generating the periodic voltage Vosc by charging and discharging a capacitor, a signal, the high-level and the low-level of which make transitions at the timing of switching the charge and discharge, may be used. In this case, the level of the release signal REL makes a transition at a timing when the periodic voltage Vosc takes a peak value or a bottom value. However, the timing of the release signal REL is not limited thereto.

Figure 6:
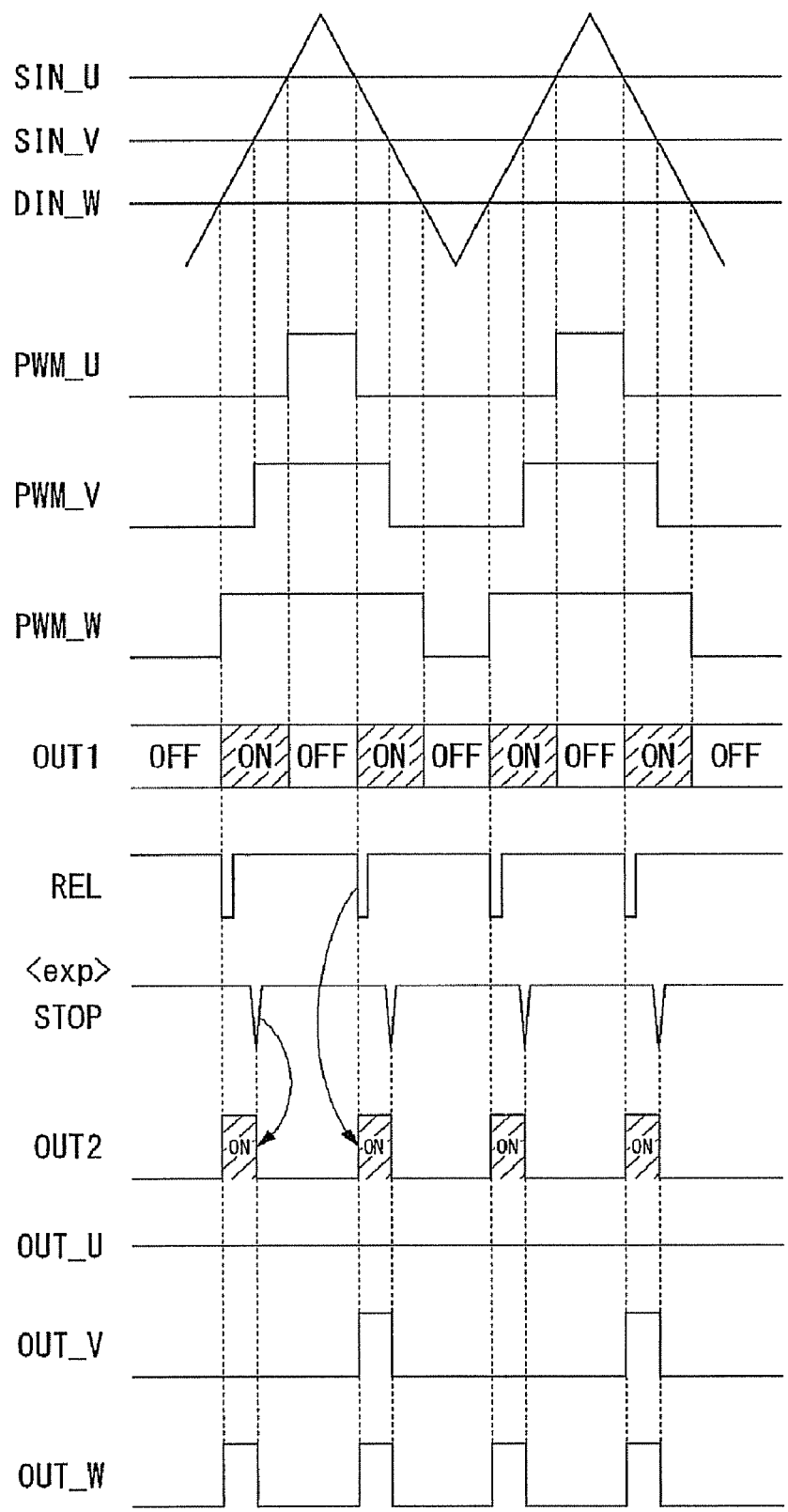
FIG. 6 is first time charts illustrating a current limiting operation of the motor drive circuit.

FIG. 6 is first time charts illustrating current limiting operations of the motor drive circuit 100. The drive unit 10 receives the PWM signals PWM_U, PWM_V and PWM_W, and excites the coils in accordance with the PWM signals when one or two of the PWM signals are at the level indicating conduction (high-level). On the other hand, when all of the three PWM signals are at the high-level or at the low-level, the drive unit 10 does not excite the coils. An excitation signal OUT1 in FIG. 6 illustrates an excitation period, where ON illustrates an excitation period and OFF a non-excitation period.

An excitation signal OUT2 is generated based on the excitation signal OUT1, stop signal STOP and release signal REL. When the excitation signal OUT1 is in an on-state (high-level), the excitation signal OUT2 makes a transition to an off-state (low-level) in accordance with the stop signal STOP. When the excitation signal OUT1 is in an off-state (low-level), the excitation signal OUT2 makes a transition to an on-state (high level) in accordance with the release signal REL.

The logic unit 12 operates logical multiplication of the excitation signal OUT2 with each of the PWM signals PWM_U, PWM_V and PWM_W such that pulse signals OUT_U, OUT_V and OUT_W, which are to be supplied to the pre-driver 14, are generated.

The excitation signals OUT1 and OUT2 are illustrated for simpler explanation, and therefore an equivalent signal is not required to be generated in the logic unit 12. Any signal processing method may be adopted as far as the pulse signals OUT_U, OUT_V and OUT_W illustrated in FIG. 6 are finally generated.

Figure 7:
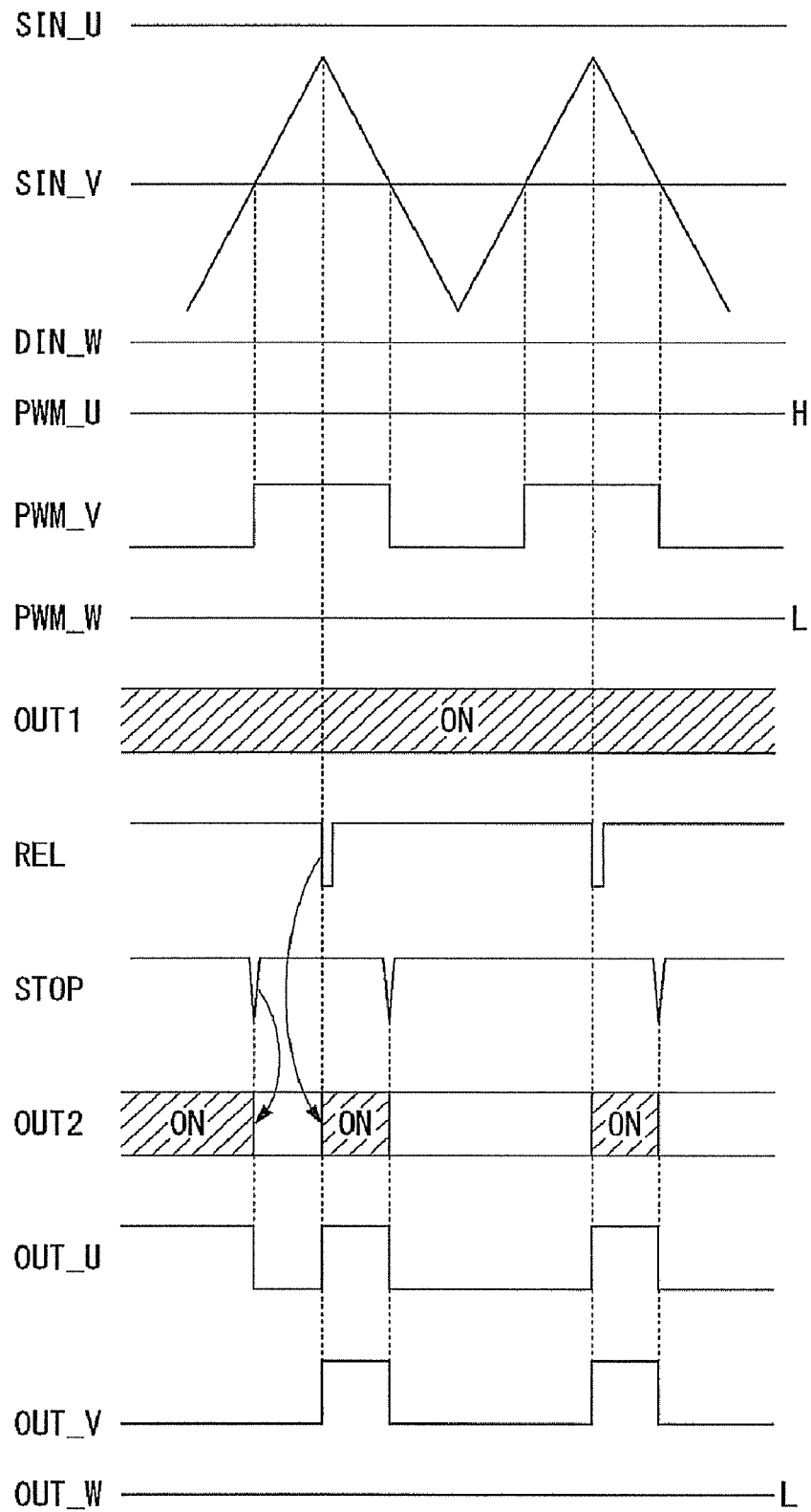
FIG. 7 is second time charts illustrating the current limiting operation of the motor drive circuit.

FIG. 7 is second time charts illustrating the current limiting operation of the motor drive circuit 100. FIG. 7 illustrates an operation in which the amplitudes of the sine wave voltages SIN_U, SIN_V and SIN_W are larger than those in FIG. 6, therefore the torque is larger than that in the same drawing.

As illustrated in FIGS. 6 and 7, according to the structure in FIG. 5, excitation of a coil is stopped immediately after a coil current exceeds a threshold value, allowing the coil current to be limited. And, because the release signal REL is synchronized with the cycle of the pulse width modulated signal, there is no fear that the current limitation may impede the PWM drive. Further, because the current limit comparator 60 compares the voltage drop across the current detecting resistor R1 directly with the threshold voltage, without smoothing the voltage drop with a filter, there occurs no phase delay. Accordingly, an overshoot of a current because of a current limit delay can be suppressed.

The motor drive circuit 100 in FIG. 1 controls the duty ratio of the PWM signal based on the torque control voltage Vt, and the circuit 100 can further control the duty ratio thereof based on a PWM signal from outside (hereinafter, referred to as an external PWM signal PWM_EXT). Such function is particularly effective for the case where a microcomputer indicates a torque by a PWM signal, for instance, when the motor drive circuit 100 is used in a cooling apparatus.

Figure 8:
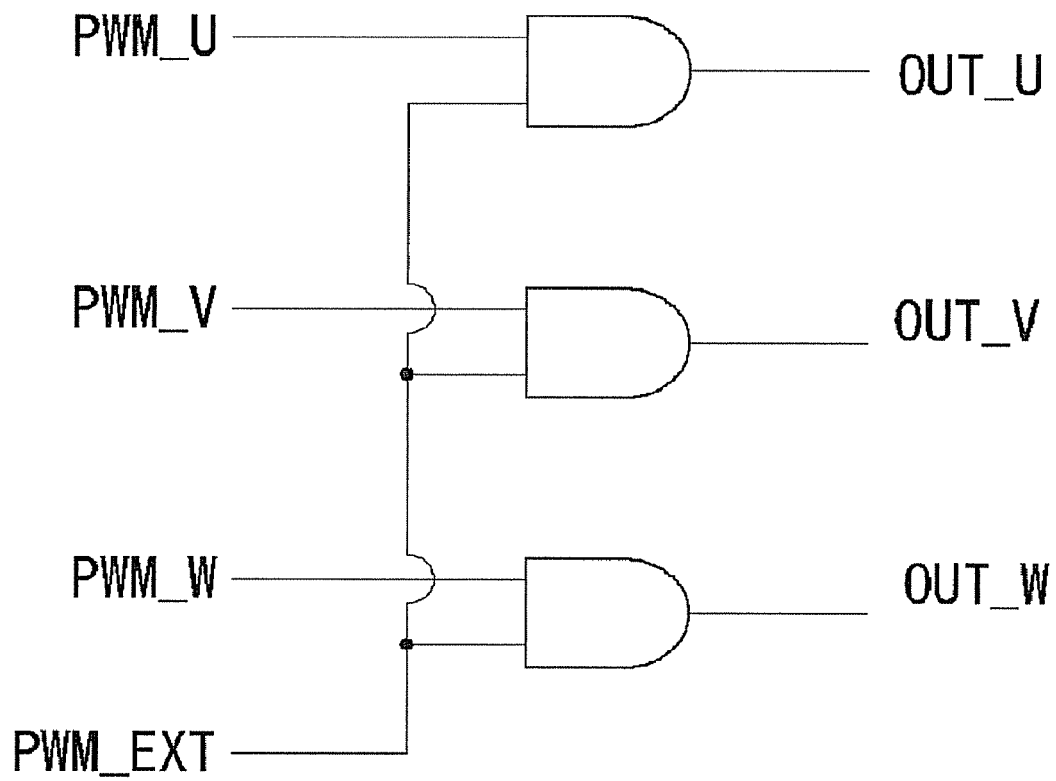
FIG. 8 is a circuit diagram illustrating part of a structure of a logic unit that drives a motor based on an external PWM signal.

Referring back to FIG. 1, the motor drive circuit 100 comprises an outside control terminal (hereinafter, referred to as an external PWM terminal) 102, to which the external PWM signal PWM_EXT is inputted. FIG. 8 is a circuit diagram illustrating part of the structure of the logic unit 12 that drives the motor 2 based on the external PWM signal PWM_EXT. The logic unit 12 performs logic synthesis on the external PWM signal PWM_EXT with each of the PWM signals PWM_U, PWM_V and PWM_W. For example, the logic unit 12 includes AND gates 70, 72 and 74 provided for each of the U-phase, V-phase and W-phase such that logical multiplication of the inputted two signals is outputted as the pulse signals OUT_U, OUT_V and OUT_W.

Figure 9:
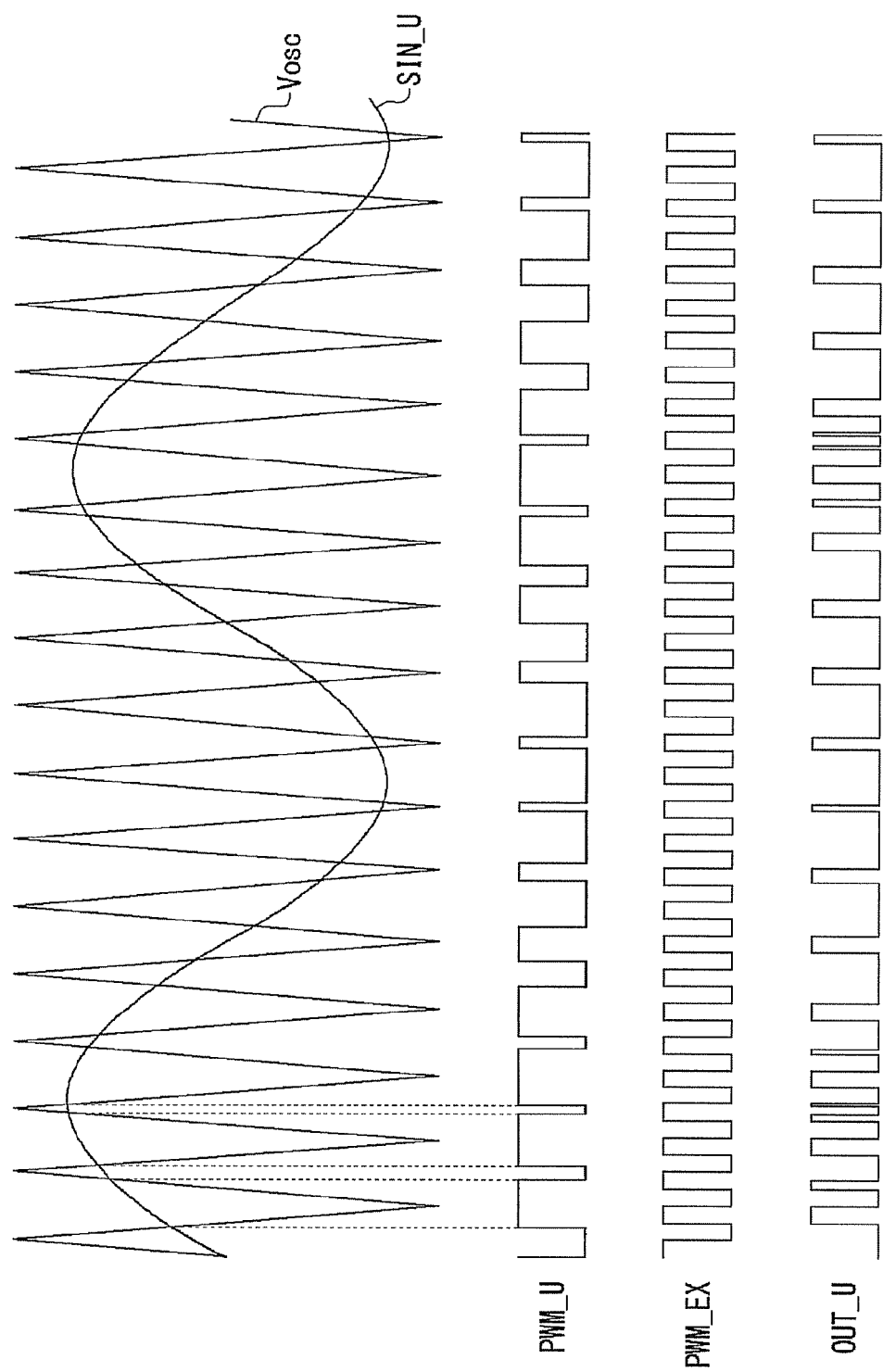
FIG. 9 is time charts illustrating torque control by the external PWM signal.

FIG. 9 is time charts illustrating torque control by the external PWM signal PWM_EXT. FIG. 9 illustrates only the U-phase, but the same is true with respect to the V-phase and the W-phase. The pulse signal OUT_U is logical multiplication of the PWM signal PWM_U generated based on the sine wave voltage SIN_U and the external PWM signal PWM_EXT. When the external PWM signal PWM_EXT is at the high-level with a duty-ratio of 100%, PWM_U=OUT_U holds, in which as the duty ratio of the external PWM signal PWM_EXT is smaller, the duty ratio of the pulse signal OUT_U becomes smaller than that specified by the PWM signal PWM_U. As a result, the torque exerted on the motor 2 can be adjusted in accordance with the external PWM signal PWM_EXT.

Conventionally, when the torque is controlled based on the external PWM signal PWM_EXT, the signal PWM_EXT is once filtered such that the signal PWM_EXT is converted into a DC signal having a voltage corresponding to the duty ratio; and then the DC signal is required to be inputted to a terminal for controlling the torque of a motor drive circuit. On the other hand, according to the motor drive circuit in FIG. 1, the external PWM signal PWM_EXT can be directly reflected on the pulse signal OUT_U. In this case, a circuit for converting the PWM signal from a microcomputer into a DC signal is not necessary outside the motor drive circuit 100, allowing its cost and circuit area to be reduced.

Further, if the external PWM signal PWM_EXT would be converted into a DC voltage to be inputted to the circuit in FIG. 1 as the torque control voltage Vt, the relative relationship between the duty ratio of the external PWM signal PWM_EXT and the torque (rotating speed) exerted on the motor 2 varies dependently on a type of the motor 2 or a method of converting the DC voltage. On the other hand, according to the motor drive circuit 100 of the present embodiment, the effective duty ratio of the pulse signals OUT_U, OUT_V and OUT_W can be varied in proportion to the duty ratio of the external PWM signal PWM_EXT, and hence the relative rotating speed of the motor 2 can be uniquely controlled by the duty ratio of the external PWM signal PWM_EXT independently from the type of the motor 2. Specifically, when the duty ratio of the external PWM signal PWM_EXT is varied to 100%, 50% or 33%, the rotating speed of the motor 2 can be varied to 1, ½ or ⅓, respectively.

The present invention has been described based on the preferred embodiments. The embodiments are intended to be illustrative only. It will be appreciated by those skilled in the art that various modifications to the constituting elements and processes could be developed and that such modifications are within the scope of the present invention.

In the embodiments, the case where the single error amplifier 32 is provided for the U-phase, V-phase and W-phase; however, the error amplifier 32 may be provided for each phase. That is, each gain of the first Hall amplifier HAMP1 to the third Hall amplifier HAMP3 may be independently subjected to feedback control in accordance with the amplitude of each output signal.

The setting of the logic with respect to the high-level and the low-level of a signal, which has been described in the preferred embodiments, illustrates only one example; however, various modifications can be made to the logic circuit block, and such modifications are encompassed by the invention.

The present invention has been described based on the preferred embodiments; however, it is clear that the embodiments illustrate only the principle and applications of the invention. Accordingly, it is needless to say that various modifications or changes in the arrangement can be made to the embodiments without departing from the spirit of the invention set forth in the appended claims.

What is claimed is:

1. A motor drive circuit that drives a three-phase motor by supplying a drive current to the three-phase motor, the motor drive circuit comprising:
a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals;
a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal;
a drive unit operative to subject a phase coil, a target to be driven, to pulse drive by using the pulse modulated signal from the corresponding phase pulse modulation comparator; and
a gain setting unit that sets a gain of the first Hall amplifier, the second Hall amplifier or the third Hall amplifier based on an error between a detection voltage corresponding to at least one of the sine wave voltages of the first Hall amplifier, the second Hall amplifier and the third Hall amplifier and a torque setting voltage indicating a torque exerted on the three-phase motor.

2. The motor drive circuit according to claim 1, wherein the detection voltage is a signal corresponding to the amplitude of the sine wave voltage.

3. The motor drive circuit according to claim 1, wherein the gain setting unit includes:
a synthesis unit that synthesizes the detection voltage from a detection signal corresponding to each of the sine wave voltages of the first Hall amplifier, the second Hall amplifier and the third Hall amplifier; and
an error amplifier that generates an error signal corresponding to an error between the detection voltage and the torque setting voltage, so that each gain of the first Hall amplifier, the second Hall amplifier and the third Hall amplifier is set in accordance with the error signal.

4. The motor drive circuit according to claim 3, wherein each of the first Hall amplifier, the second Hall amplifier and the third Hall amplifier outputs, as a current signal, a detection signal having a waveform obtained by subjecting the sine wave voltage to half-wave rectification, and wherein the synthesis unit includes a synthesizing resistor, one end of which receives current signals outputted from the first Hall amplifier, the second Hall amplifier and the third Hall amplifier and a voltage at the other end of which is fixed, so that a voltage drop across the synthesizing resistor is outputted as the detection voltage.

5. The motor drive circuit according to claim 1, wherein the drive unit includes:
a first inverter, a second inverter and a third inverter, which are push-pull inverters provided for each phase; and
a current detecting resistor that is provided between a common connection point on the lower voltage sides of the first inverter, the second inverter and the third inverter and a ground terminal, and wherein the motor drive circuit further comprises a current limit comparator that compares a voltage drop across the current detecting resistor with a predetermined threshold voltage, and wherein the drive unit stops excitation of each coil of the three-phase motor when the voltage drop exceeds the threshold voltage.

6. The motor drive circuit according to claim 5, wherein, after stopping excitation of each coil of the three-phase motor, the drive unit releases the stop of excitation based on a release signal having a predetermined cycle.

7. The motor drive circuit according to claim 6, wherein the release signal is synchronized with the periodic voltage.

8. The motor drive circuit according to claim 7, wherein the release signal is synchronized with a timing when the periodic voltage takes a peak value or a bottom value.

9. The motor drive circuit according to claim 1, wherein the drive unit receives a pulse modulated control signal inputted from outside, which has been subjected to pulse modulation, and performs logic synthesis on the pulse modulated control signal with each output signal from the first pulse modulation comparator, the second pulse modulation comparator and the third pulse modulation comparator, so that the three-phase motor is driven based on the synthesized signal.

10. A cooling apparatus comprising:
a three-phase fan motor; and
the motor drive circuit according to claim 1 for driving the three-phase fan motor.

11. A motor drive method for driving a three-phase motor by supplying a drive current to the three-phase motor, the motor drive method comprising:
amplifying a difference between a pair of Hall signals of each phase to generate each phase sine wave voltage;

comparing the each phase sine wave voltage with a periodic voltage to generate each phase pulse modulated signal;

subjecting a phase coil, a target to be driven, to pulse drive by using a corresponding phase pulse modulated signal; and adjusting a gain for amplifying the difference between the pair of Hall signals such that a detection voltage corresponding to at least one phase sine wave voltage and a torque setting voltage indicating a torque exerted on the three-phase motor, are equal to each other.

12. A motor drive circuit that drives a three-phase motor by supplying a drive current to the three-phase motor, the motor drive circuit comprising:

a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals;

a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal;

an outside control terminal to which an external pulse modulated signal having a duty ratio corresponding to a target torque is inputted from an outside circuit; and a drive unit that synthesizes a signal from the each phase pulse modulated signal and the external pulse modulated signal to subject a phase coil, a target to be driven, to pulse drive based on the synthesized signal.

13. The motor drive circuit according to claim 12 further comprising:

a gain setting unit that sets a gain of the first Hall amplifier, the second Hall amplifier or the third Hall amplifier based on an error between a detection voltage corresponding to at least one of the sine wave voltages of the first Hall amplifier, the second Hall amplifier and the third Hall amplifier and a predetermined reference voltage.

14. A cooling apparatus comprising:
a three-phase fan motor; and
the motor drive circuit according to claim 12 for driving the three-phase fan motor.

15. A motor drive method for driving a three-phase motor by supplying a drive current to the three-phase motor, the motor drive method comprising:

amplifying a difference between a pair of Hall signals of each phase to generate each phase sine wave voltage;

comparing the each phase sine wave voltage with a periodic voltage to generate each phase pulse modulated signal;

generating an external pulse modulated signal having a duty ratio corresponding to a target torque; and synthesizing a signal from the each phase pulse modulated signal and the external pulse modulated signal to subject a phase coil, a target to be driven, to pulse drive based on the synthesized signal.

16. The motor drive method according to claim 15 further comprising:

adjusting a gain for amplifying the difference between the pair of Hall signals such that a detection voltage corresponding to at least one phase sine wave voltage and the predetermined reference voltage are equal to each other.

17. A motor drive circuit that drives a three-phase motor by supplying a drive current to the three-phase motor, the motor drive circuit comprising:

a first Hall amplifier, a second Hall amplifier and a third Hall amplifier, each of which is provided for each phase of the three-phase motor and receives a pair of Hall signals from a corresponding phase Hall element to generate each phase sine wave voltage by amplifying a difference between the pair of Hall signals;

a first pulse modulation comparator, a second pulse modulation comparator and a third pulse modulation comparator, each of which is provided for each phase of the three-phase motor and compares the corresponding phase sine wave voltage with a periodic voltage to generate each phase pulse modulated signal;

a first inverter, a second inverter and a third inverter, which are push-pull inverters provided for each phase;

a drive unit that includes a current detecting resistor that is provided between a common connection point on the lower voltage sides of the first inverter, the second inverter and the third inverter and a ground terminal, and that subjects a phase coil, a target to be driven, to pulse drive by using the pulse modulated signal from the corresponding phase pulse modulation comparator; and a current limit comparator that compares a voltage drop across the current detecting resistor with a predetermined threshold voltage, wherein the drive unit stops excitation of each coil of the three-phase motor when the voltage drop exceeds the threshold voltage.

18. The motor drive circuit according to claim 17, wherein, after stopping excitation of each coil of the three-phase motor, the drive unit releases the stop of excitation based on a release signal having a predetermined cycle.

19. The motor drive circuit according to claim 18, wherein the release signal is synchronized with the periodic voltage.

20. The motor drive circuit according to claim 19, wherein the release signal is synchronized with a timing when the periodic voltage takes a peak value or a bottom value.

21. The motor drive circuit according to claim 17, wherein the drive unit excites the coil when one or two of the pulse modulated signals outputted from the first pulse modulation comparator, the second pulse modulation comparator and the third pulse modulation comparator are at the level indicating conduction, and when the voltage drop is smaller than the threshold voltage.

22. A cooling apparatus comprising:
a three-phase fan motor: and
the motor drive circuit according to claim 17 for driving the three-phase motor.

23. A motor drive method for driving a three-phase motor by supplying a drive current to the three-phase motor, the motor drive method comprising:

amplifying a difference between a pair of Hall signals of each phase to generate each phase sine wave voltage;

comparing the each phase sine wave voltage with a periodic voltage to generate each phase pulse modulated signal;

subjecting a selected phase coil, a target to be driven, to pulse drive by using a corresponding phase pulse modulated signal;

converting a coil current of the three-phase motor into a voltage proportional to the coil current; and comparing the converted voltage with a predetermined threshold voltage such that excitation of each coil of the three-phase motor is stopped when the converted voltage exceeds the predetermined threshold voltage.

* * * * *